(12) United States Patent
Kwak

(10) Patent No.: US 10,108,059 B2
(45) Date of Patent: Oct. 23, 2018

(54) DISPLAY SUBSTRATE, LIQUID CRYSTAL DISPLAY COMPRISING THE SAME, AND METHOD OF MANUFACTURING THE SAME

(71) Applicant: Samsung Display Co., Ltd., Yongin-si, Gyeonggi-do (KR)

(72) Inventor: Changhun Kwak, Suwon-si (KR)

(73) Assignee: Samsung Display Co., Ltd. (KR)

( * ) Notice: Subject to any disclaimer, the term of this patent is extended or adjusted under 35 U.S.C. 154(b) by 165 days.

(21) Appl. No.: 15/346,645

(22) Filed: Nov. 8, 2016

(65) Prior Publication Data

US 2017/0131605 A1 May 11, 2017

(30) Foreign Application Priority Data

Nov. 9, 2015 (KR) ........................ 10-2015-0156436

(51) Int. Cl.
| | |
|---|---|
| *G02F 1/1335* | (2006.01) |
| *G02F 1/1362* | (2006.01) |
| *G02F 1/1333* | (2006.01) |
| *G02F 1/1339* | (2006.01) |
| *G02F 1/1368* | (2006.01) |

(52) U.S. Cl.
CPC ...... *G02F 1/136209* (2013.01); *G02F 1/1368* (2013.01); *G02F 1/13392* (2013.01); *G02F 1/133345* (2013.01); *G02F 1/136286* (2013.01); *G02F 2001/133388* (2013.01); *G02F 2001/136222* (2013.01);
(Continued)

(58) Field of Classification Search
CPC ............ G02F 1/133345; G02F 1/1368; G02F 1/136286; G02F 1/136209; G02F 1/13392; G02F 2201/123; G02F 2001/136295; G02F 2001/136222; G02F 2201/52; G02F 2001/133388
USPC ...................................................... 349/106
See application file for complete search history.

(56) References Cited

U.S. PATENT DOCUMENTS 5,414,547 A * 5/1995 Matsuo ............. G02F 1/136209
349/44
6,268,895 B1 * 7/2001 Shimada ........... G02F 1/133512
349/110
(Continued)

FOREIGN PATENT DOCUMENTS

| KR | 10-2009-0117317 A | 11/2009 |
| KR | 10-2015-0080721 A | 7/2015 |
| KR | 10-2015-0083564 A | 7/2015 |

*Primary Examiner* — Hoan C Nguyen
(74) *Attorney, Agent, or Firm* — Innovation Counsel LLP

(57) ABSTRACT

A display substrate includes a base substrate having a display area and a non-display area surrounding the display area; a gate line disposed on the base substrate and extending in a first direction; a data line disposed on the base substrate and extending in a second direction; a thin film transistor connected to the gate line and the data line; a color filter disposed on the thin film transistor in the display area; a pixel electrode disposed on the color filter and connected to the thin film transistor; a black matrix pattern disposed to correspond to the gate line and the data line; a black border pattern disposed in the non-display area, and including a first border pattern having a first thickness and a second border pattern having a second thickness that is less than the first thickness; and a gate metal pattern disposed below the second border pattern.

20 Claims, 8 Drawing Sheets

(52) U.S. Cl.
CPC ............ *G02F 2001/136295* (2013.01); *G02F 2201/123* (2013.01); *G02F 2201/52* (2013.01)

(56) References Cited

U.S. PATENT DOCUMENTS

| | | | |
|---|---|---|---|
| 2007/0291203 A1* | 12/2007 | Nakahara | ............... G02F 1/1339 349/113 |
| 2013/0329155 A1 | 12/2013 | Kwak et al. | |
| 2015/0029428 A1* | 1/2015 | Wang | .................... G02B 5/201 349/42 |
| 2015/0185549 A1 | 7/2015 | Jeon et al. | |
| 2015/0198842 A1 | 7/2015 | Kwak et al. | |

* cited by examiner

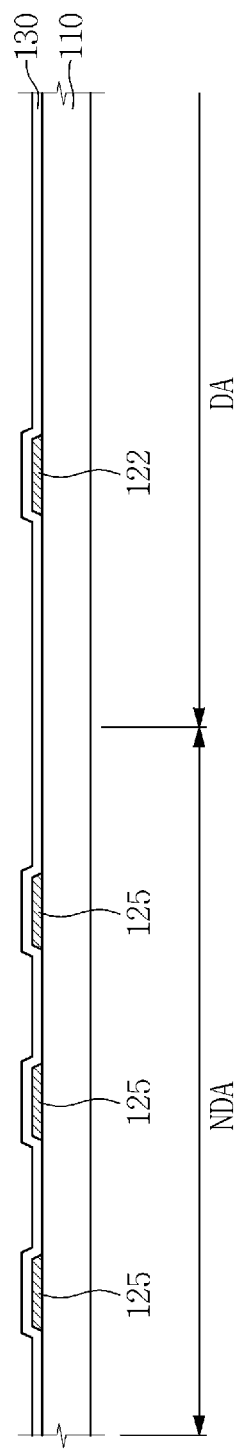
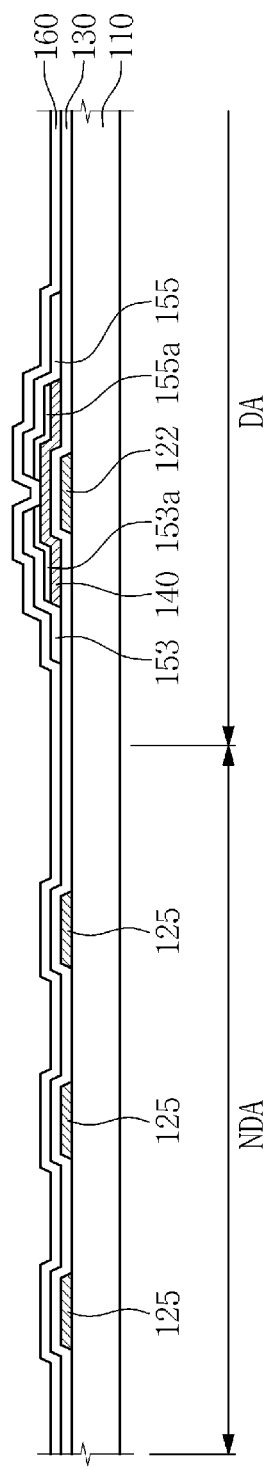

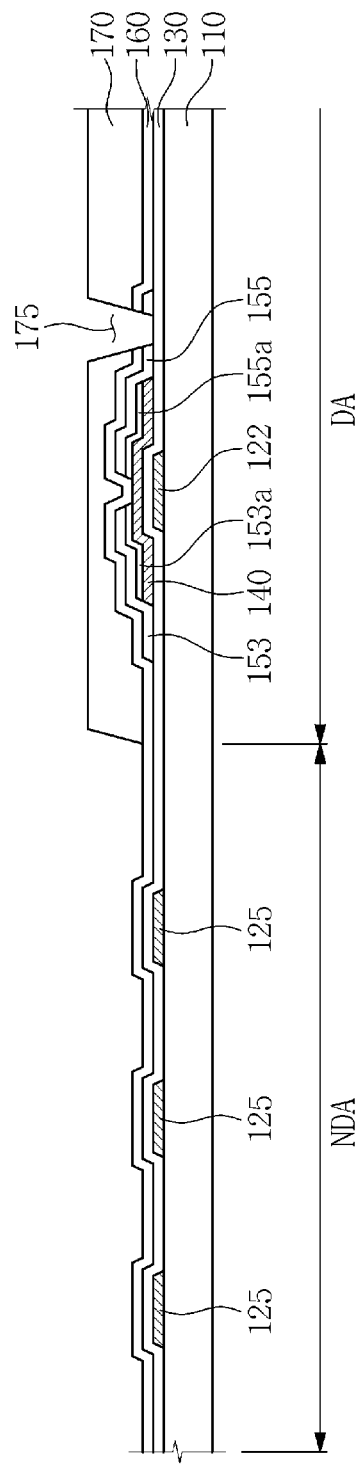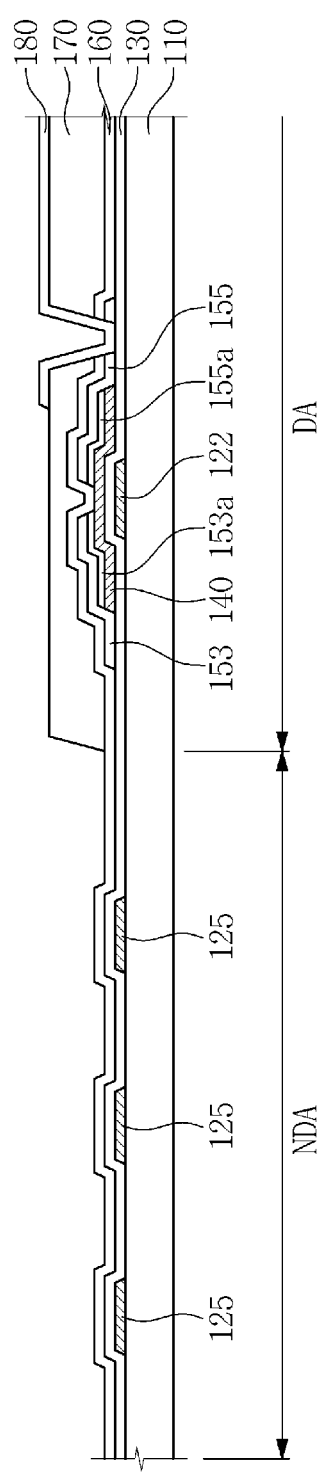

DISPLAY SUBSTRATE, LIQUID CRYSTAL DISPLAY COMPRISING THE SAME, AND METHOD OF MANUFACTURING THE SAME

CROSS-REFERENCE TO RELATED APPLICATION

This application claims the priority to and the benefits under 35 U.S.C. § 119 of Korean Patent Application No. 10-2015-0156436, filed on Nov. 9, 2015, with the Korean Intellectual Property Office ("KIPO"), the disclosure of which is incorporated herein in its entirety by reference.

BACKGROUND

1. Field

Aspects of embodiments of the present disclosure relate to a display substrate improved in terms of a display quality, a liquid crystal display ("LCD") device including the display substrate, and a method of manufacturing the LCD device.

2. Description of the Related Art

Display devices are classified into liquid crystal display ("LCD") devices, organic light emitting diode ("OLED") display devices, plasma display panel ("PDP") devices, electrophoretic display ("EPD") devices, and the like, based on a light emitting scheme.

An LCD device generally includes a display substrate including an electrode formed thereon, an opposing substrate, and a liquid crystal layer disposed between the display substrate and the opposing substrate. Recently, a color-filter on array (COA) structure is applied to LCD devices in which a color filter is disposed on a display substrate to improve transmittance.

In an attempt to efficiently reduce or prevent misalignment arising in the process of coupling a display substrate on which a color filter is disposed and an opposing substrate on which a shielding member is disposed, a black matrix on array (BOA) structure is applied to LCD devices in which a color filter and a shielding member are disposed on the display substrate. Besides, a black column spacer (BCS) structure is developed in which a spacer for maintaining a gap between a display substrate and an opposing substrate is formed of the same material as that forming a shielding member.

The shielding member may include a black matrix pattern disposed on a gate line or a data line in a display area and a black border pattern in a non-display area around the display area. It is necessary that the black matrix pattern has a thickness less than a predetermined thickness due to a structure therebelow such as a color filter, and the black border pattern has a thickness greater than the thickness of the black matrix pattern to prevent light leakage. In addition, the black matrix pattern and the black border pattern may be formed simultaneously using a halftone mask, and in such a case, a portion of the black matrix pattern adjacent to the black border pattern may be over-etched due to loading effects.

In a conventional LCD device, in order to obviate the aforementioned issues, a portion of the black border pattern adjacent to the black matrix pattern is formed to have the same thickness as that of the black matrix pattern to prevent over-etching of the black matrix pattern that may occur due to loading effects, and a dummy color filter is disposed below a portion of the black border pattern adjacent to the black matrix pattern to prevent light leakage.

In such a case, a step difference may increase at a portion where the black border pattern and the dummy color filter overlap each other, thus causing defects of low flowability of liquid crystal molecules. That is, liquid crystal molecules may not be suitably filled in a non-display area such that cell-gap uniformity may decrease, and a display quality may be degraded.

It is to be understood that this background section is intended to provide useful background information for understanding the present disclosure and as such disclosed herein, the background section may include ideas, concepts or recognitions that were not part of what is known or appreciated by those skilled in the pertinent art prior to a corresponding effective filing date of the subject matter disclosed herein.

SUMMARY

Embodiments of the present disclosure are directed to a liquid crystal display ("LCD") device capable of efficiently reducing or preventing defects caused by loading effects, light leakage, and defects of low flowability of liquid crystal molecules, and to a method of manufacturing the LCD device.

According to an embodiment of the present disclosure, a display substrate includes a base substrate having a display area and a non-display area surrounding the display area; a gate line disposed on the base substrate and extending in a first direction; a data line disposed on the base substrate and extending in a second direction; a thin film transistor connected to the gate line and the data line; a color filter disposed on the thin film transistor in the display area; a pixel electrode disposed on the color filter and connected to the thin film transistor; a black matrix pattern disposed to correspond to the gate line and the data line; a black border pattern disposed in the non-display area, the black border pattern including a first border pattern having a first thickness and a second border pattern having a second thickness that is less than the first thickness of the first border pattern; and a gate metal pattern disposed below the second border pattern.

The gate metal pattern may have a thickness in a range of about 0.1 μm to about 1.0 μm.

Each of the first border pattern and the second border pattern may have a thickness in a range of about 2.5 μm to about 3.5 μm.

Each of the first border pattern and the second border pattern may have a step difference in a range of about 0.3 μm to about 0.7 μm.

The gate metal pattern and the gate line may be disposed on the same layer.

The first border pattern and the second border pattern may be alternately disposed in a plan view.

The black matrix pattern and the black border patter may have a substantially same height substantially at a portion of the black matrix pattern contacting the black border pattern.

The color filter may be absent below the black border pattern at a portion where the black border pattern and the black matrix pattern contact each other.

The black matrix pattern may be dipsosed on the color filter and may further include a column spacer disposed on the black matrix pattern.

According to an embodiment of the present disclosure, a liquid crystal display (LCD) device includes a display substrate; an opposing substrate facing the display substrate; and a liquid crystal layer disposed between the display substrate and the opposing substrate. The display substrate includes a base substrate having a display area and a non-display area surrounding the display area; a gate line disposed on the base substrate and extending in a first direction; a data line disposed on the base substrate and extending in a second direction; a thin film transistor connected to the gate line and the data line; a color filter disposed on the thin film transistor in the display area; a pixel electrode disposed on the color filter and connected to the thin film transistor; a black matrix pattern disposed to correspond to the gate line and the data line; a black border pattern disposed in the non-display area, the black border pattern including a first border pattern having a first thickness and a second border pattern having a second thickness that is less than the first thickness of the first border pattern; and a gate metal pattern disposed below the second border pattern.

The gate metal pattern may have a thickness in a range of about 0.1 µm to about 1.0 µm.

Each of the first border pattern and the second border pattern may have a thickness in a range of about 2.5 µm to about 3.5 µm.

Each of the first border pattern and the second border pattern may have a step difference in a range of about 0.3 µm to about 0.7 µm.

The gate metal pattern and the gate line may be disposed on the same layer.

The first border pattern and the second border pattern may be alternately disposed in a plan view.

The black matrix pattern and the black border pattern may have a substantially same height at a portion of the black matrix pattern contacting the black border pattern.

According to an embodiment of the present disclosure, a method of manufacturing an LCD device includes preparing a base substrate having a display area and a non-display area surrounding the display area; forming a gate line on the base substrate, the gate line extending in a first direction; forming a data line on the base substrate, the data line extending in a second direction; forming a thin film transistor connected to the gate line and the data line and a pixel electrode being connected to the thin film transistor; and forming a black matrix pattern on the gate line and the data line and a black border pattern in the non-display area. The forming of the black border pattern includes simultaneously forming, using a mask having a semi-transmissive portion, a first border pattern having a first thickness and a second border pattern having a second thickness that is less than the first thickness of the first border pattern.

The method may further include forming a gate metal pattern below the second border pattern.

The gate metal pattern and the gate line may be formed simultaneously.

The first border pattern and the second border pattern may be alternately formed in a plan view.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure will be more clearly understood from the following detailed description taken in conjunction with the accompanying drawings, in which:

FIGS. 6A, 6B, 6C, 6D, and 6E are cross-sectional views illustrating a method of manufacturing an LCD device, according to an exemplary embodiment.

DETAILED DESCRIPTION

Figure 1:
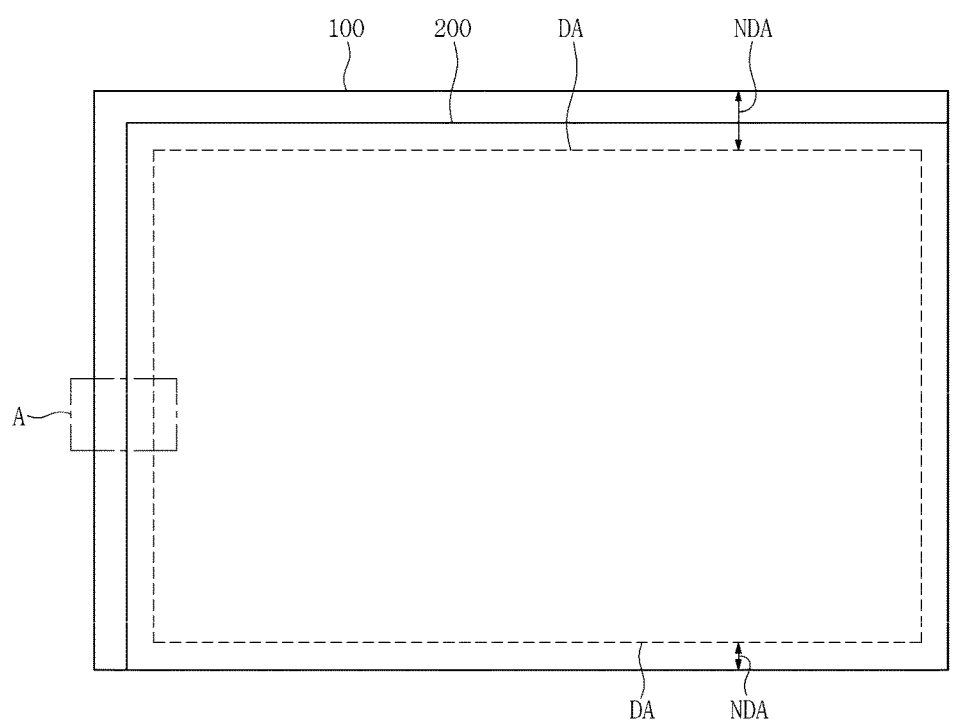
FIG. 1 is a schematic plan view illustrating a liquid crystal display ("LCD") device, according to an exemplary embodiment.

Hereinafter, embodiments of the present disclosure will be described in detail with reference to the accompanying drawings.

Although the present disclosure can be modified in various manners and have several embodiments, specific embodiments are illustrated in the accompanying drawings and will be mainly described in the specification. However, the scope of the embodiments of the present disclosure is not limited to the specific embodiments and should be construed as including changes, equivalents, and substitutions included in the spirit and scope of the present disclosure.

In the drawings, certain elements or shapes may be simplified or exaggerated to better illustrate the present disclosure, and some elements present in an actual product may be omitted. Thus, the drawings are intended to facilitate the understanding of the present disclosure. Like reference numerals refer to like elements throughout the specification.

When a layer or element is referred to as being "on" another layer or element, the layer or element may be directly over the other layer or element, or one or more intervening layers or elements may be interposed therebetween.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the present disclosure.

The spatially relative terms "below," "beneath," "lower," "above," "upper," and the like, may be used herein for ease of description to describe the relations between one element or component and another element or component. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" or "on"

another device. Accordingly, the illustrative term "below" may include both the lower and upper positions. The device may also be oriented in another direction, and thus the spatially relative terms may be interpreted differently depending over the orientations.

Unless otherwise defined, all terms used herein (including technical and scientific terms) have the same meaning as commonly understood by those skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts that may not be associated with the description may not be provided in order to specifically describe embodiments of the present disclosure.

Figure 2:
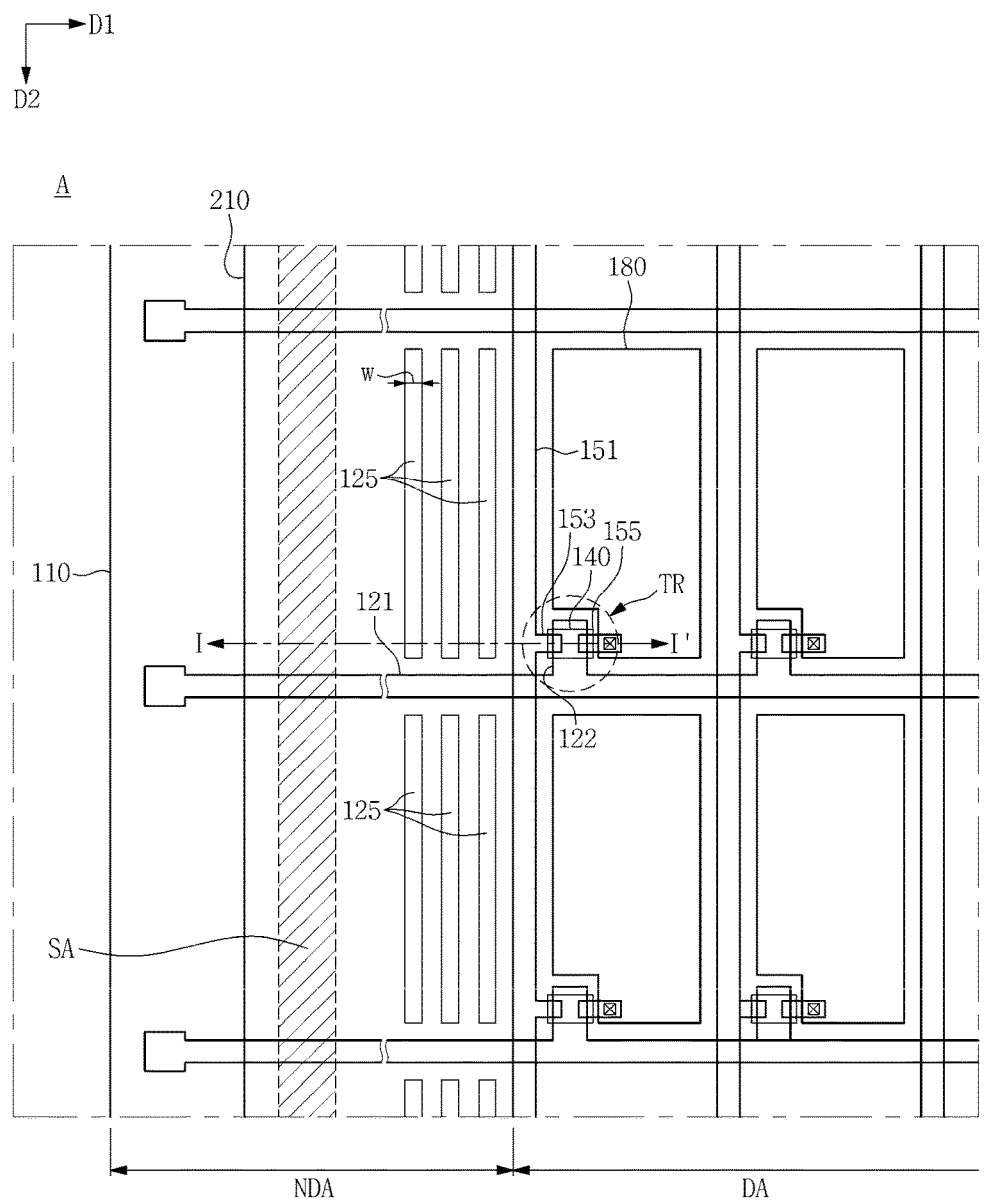
FIG. 2 is a partial enlarged view illustrating a portion "A" of FIG. 1.

FIG. 1 is a schematic plan view illustrating a liquid crystal display ("LCD") device, according to an exemplary embodiment; FIG. 2 is a partial enlarged view illustrating a portion "A" of FIG. 1; and FIG. 3 is a cross-sectional view taken along line I-I' of FIG. 2.

Figure 3:
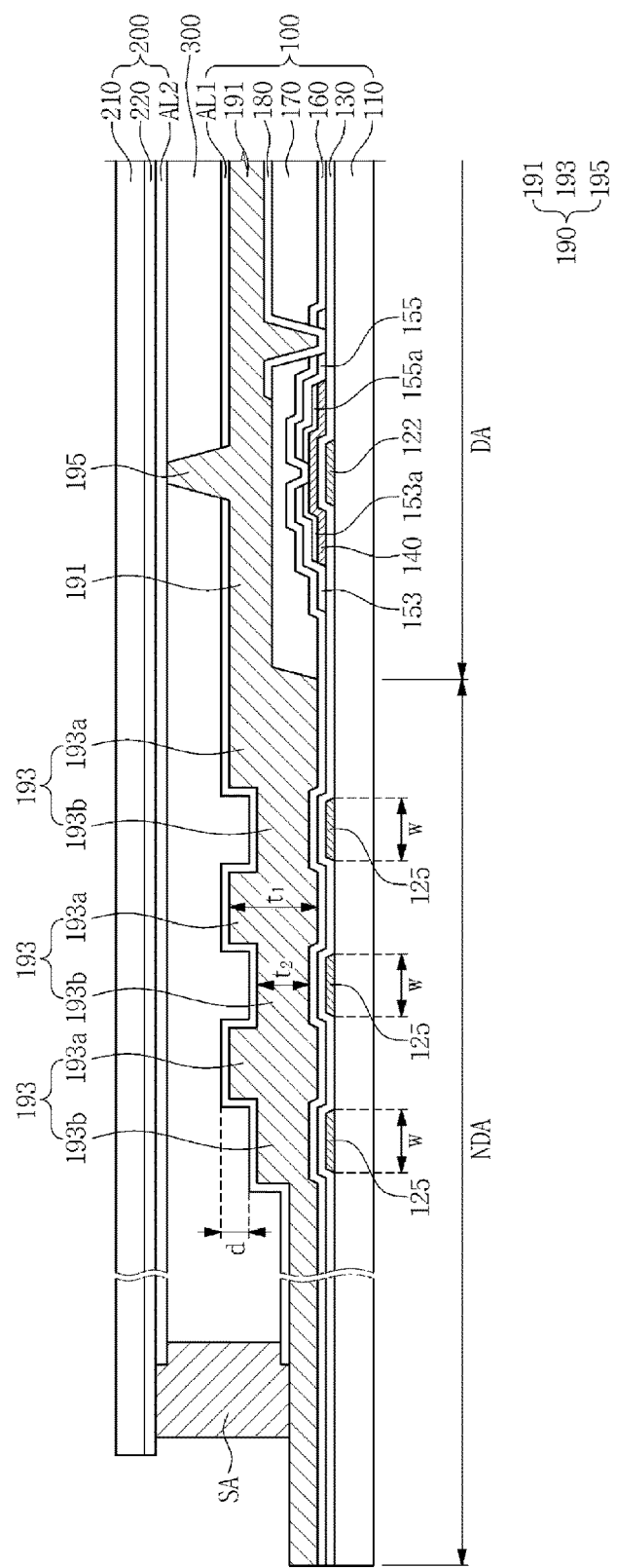
FIG. 3 is a cross-sectional view taken along line I-I' of FIG. 2.

In reference to FIGS. 1, 2, and 3, the LCD device includes a display substrate 100, an opposing substrate 200, and a liquid crystal layer 300 disposed between the display substrate 100 and the opposing substrate 200.

The LCD device has a display area DA on which an image is displayed and a non-display area NDA surrounding the display area DA. In addition, the LCD device may further include a backlight unit (not illustrated) that is configured to emit light toward the display substrate 100.

The display substrate 100 includes a base substrate 110, gate wirings 121, 122, and 125, a first insulating layer 130, a semiconductor layer 140, data wirings 151, 153, and 155, a second insulating layer 160, a color filter 170, a pixel electrode 180, a first alignment layer AL1.

The base substrate 110 may be an insulating substrate, such as a plastic substrate that transmits light and is flexible. However, exemplary embodiments are not limited thereto, and the base substrate 110 may include or be formed of a hard substrate such as a glass substrate.

The gate wirings 121, 122, and 125 may include or be formed of aluminum (Al) or alloys thereof, silver (Ag) or alloys thereof, copper (Cu) or alloys thereof, molybdenum (Mo) or alloys thereof, chromium (Cr), tantalum (Ta), titanium (Ti), and/or the like.

In some embodiments, the gate wirings 121, 122, and 125 may have a multilayer structure including two or more conducting layers (not illustrated) having different physical properties. For example, a conducting layer of the multilayer structure may include or be formed of metal having low resistivity to reduce signal delay or voltage drop such as an aluminum (Al)-based metal, a silver (Ag)-based metal, and a copper (Cu)-based metal, and another conducting layer of the multilayer structure may include a material that is found to impart an excellent contact property with indium tin oxide (ITO) and indium zinc oxide (IZO) such as a molybdenum-based metal, chromium, titanium, and tantalum.

Other examples of the multilayer structure may include a chromium lower layer and an aluminum upper layer, an aluminum lower layer and a molybdenum upper layer, a titanium lower layer, and a copper upper layer. However, the present disclosure is not limited thereto, and the gate wirings 121, 122, and 125 may include various kinds and number of layers of metals and conductors.

The gate wirings 121, 122, and 125 include a gate line 121 extending in a direction, for example, a first direction D1, a gate electrode 122 extending in a second direction D2, and at least one gate metal pattern 125 over the base substrate 110 in the non-display area NDA. The gate wirings 121, 122, and 125 may be simultaneously formed in the same process.

The gate line 121 transmits a gate signal, and the gate electrode 122, along with a source electrode 153 and a drain electrode 155 to be described below, constitutes three terminals of a thin film transistor TR.

Figure 4:
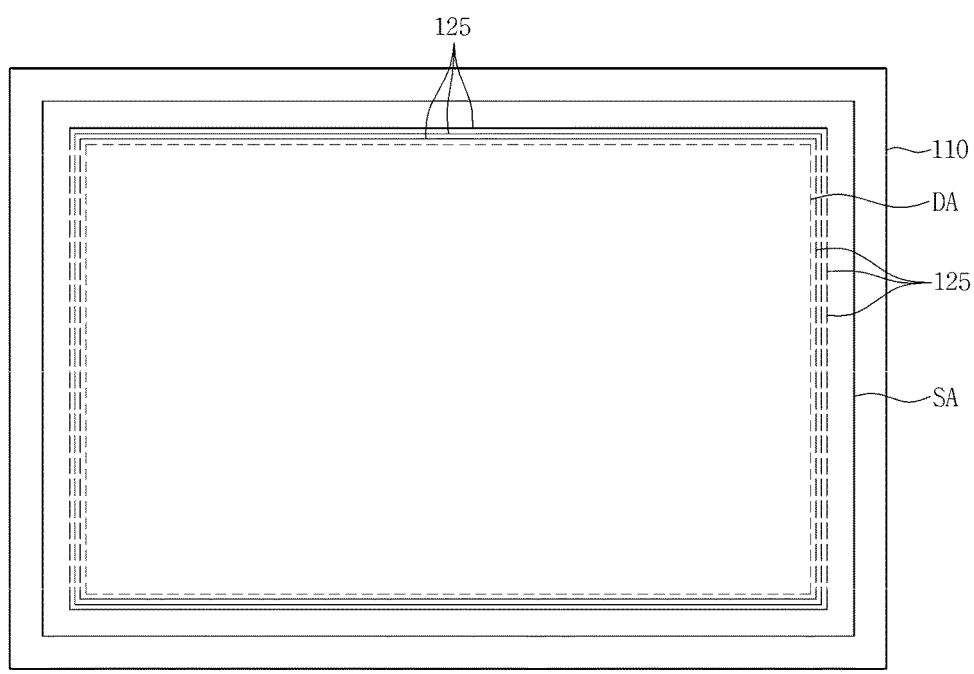
FIG. 4 is a schematic plan view illustrating a gate metal pattern, according to an exemplary embodiment.

FIG. 4 is a schematic plan view illustrating the gate metal pattern 125, according to an exemplary embodiment.

In reference to FIGS. 1, 2, 3, and 4, the gate metal pattern 125 is disposed in the non-display area NDA adjacent to the display area DA and may extend along the non-display area NDA. To prevent the gate metal pattern 125 from being connected to the gate line 121 that extends to the non-display area NDA, the gate metal pattern 125 that extends in the second direction D2 may have an island shape. Three gate metal patterns 125 are illustrated in FIGS. 2, 3, and 4, but exemplary embodiments are not limited thereto. In an alternative exemplary embodiment, at least one gate metal pattern 125 may be provided.

The gate metal pattern 125 may have a thickness in a range of about 0.1 μm to about 1.0 μm, and may have a width w in a range of about 2 μm to about 15 μm.

The gate metal pattern 125 may not be connected to a conductor (e.g., a gate wiring, a data wiring, a storage wiring, and a pixel electrode). That is, the gate metal pattern 125 floats electrically.

The gate metal pattern 125 may be disposed to correspond to a second border pattern 185 to be described hereinbelow, and along with the second border pattern 185, may efficiently reduce or prevent light leakage.

The first insulating layer 130 is disposed over the base substrate 110 on which the gate wirings 121, 122, and 125 are disposed. The first insulating layer 130 may also be referred to as a gate insulating layer. The first insulating layer 130 may include silicon oxide ($SiO_x$) or silicon nitride ($SiN_x$). In addition, the first insulating layer 130 may further include aluminum oxide, titanium oxide, tantalum oxide, or zirconium oxide.

The semiconductor layer 140 is disposed over the first insulating layer 130 at a portion corresponding to the gate electrode 122. The semiconductor layer 140 may include a semiconductor material such as amorphous silicon and crystalline silicon. In addition, the semiconductor layer 140 may further include an oxide semiconductor such as IGZO, ZnO, $SnO_2$, $In_2O_3$, $Zn_2SnO_4$, $Ge_2O_3$, and $HfO_2$ and a compound semiconductor such as GaAs, GaP, and InP.

In an exemplary embodiment, the semiconductor layer 140 is depicted as substantially overlapping the gate electrode 122. However, exemplary embodiments are not limited thereto, and the semiconductor layer 140 may substantially overlap the data wirings 151, 153, and 155 to be described hereinbelow.

The data wirings 151, 153, and 155 are disposed over the base substrate 110 on which the semiconductor layer 140 is disposed. The data wirings 151, 153, and 155 may be formed of the same material as that forming the gate wirings 121, 122, and 125.

The data wirings 151, 153, and 155 include a data line 151 extending in a direction intersecting the gate line 121, for example, the second direction D2, a source electrode 153 branching off from the data line 151 to extend onto the semiconductor layer 140, a drain electrode 155 spaced apart from the source electrode 153 and overlapping a portion of the semiconductor layer 140. The data wirings 151, 153, and 155 may be simultaneously formed in the same process.

Ohmic contact layers 153a and 155a may further be disposed between the source electrode 153 and the semiconductor layer 140 and between the drain electrode 155 and the semiconductor layer 140, respectively, to improve electric properties.

A channel through which electric charges are transmitted when the thin film transistor TR is operated is formed in the semiconductor layer 140 between the source electrode 153 and the drain electrode 155.

The second insulating layer 160 is disposed over the base substrate 110 on which the data wirings 151, 153, and 155 are formed. The second insulating layer 160 may have a monolayer structure or a multilayer structure including, for example, silicon oxide, silicon nitride, a photosensitive organic material, a low dielectric constant insulating material, such as a-Si:C:O or a-Si:O:F.

The color filter 170 is disposed over the second insulating layer 160 in the display area DA.

The color filter 170 may be one of red, green, blue, cyan, magenta, yellow, and white. Three primary colors of red, green, and blue or cyan, magenta, and yellow may constitute a base pixel group for color formation.

The color filter 170 may have a contact hole 175 exposing a portion of the drain electrode 155. Although not illustrated, a capping layer (not illustrated) may further be disposed over the color filter 170. The capping layer serves to prevent permeation of contaminants into the liquid crystal layer 300. The capping layer may include or be formed of an organic material or an inorganic material including silicon nitride (SiNx), silicon oxide (SiOx), and carbon-injected silicon oxide (SiOC).

The pixel electrode 180 is disposed over the color filter 170. The pixel electrode 180 may be an electrode including or be formed of a transparent conductor such as indium tin oxide (ITO) or indium zinc oxide (IZO). The pixel electrode 180 may have a rectangular shape in a plan view.

Figure 5:
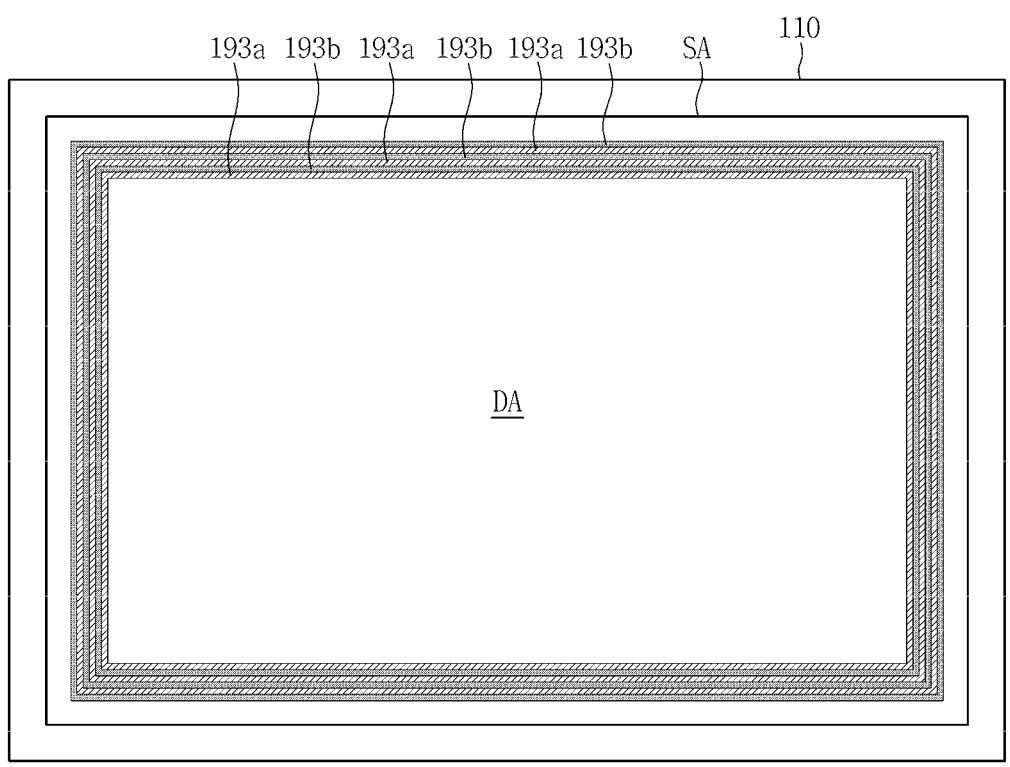
FIG. 5 is a schematic plan view illustrating a black border pattern, according to an exemplary embodiment.

FIG. 5 is a schematic plan view illustrating a black border pattern 193, according to an exemplary embodiment.

In reference to FIGS. 1, 2, 3, 4, and 5, a shielding member 190 is disposed over the base substrate 110 on which the color filter 170 and the pixel electrode 180 are disposed.

The shielding member 190 includes a black matrix pattern 191, the black border pattern 193, and a column spacer 195. The black matrix pattern 191 is disposed over the color filter 170 in the display area DA to correspond to the gate line 121 or the data line 151. The black border pattern 193 is disposed in the non-display area NDA and including a first border pattern 193a having a first thickness $t_1$ and a second border pattern 193b having a second thickness t2 that is less than the first thickness $t_1$.

The shielding member 190 may include or be formed of metal such as chrome oxide (CrOx), and an opaque organic layer material.

The black matrix pattern 191, the black border pattern 193, and the column spacer 195 may include the same material. In an exemplary embodiment, after a material for forming the shielding member 190 is disposed on the base substrate 110, the black matrix pattern 191, the black border pattern 193, and the column spacer 195 may be simultaneously formed using a mask having a transmissive portion and a semi-transmissive portion, which will be described in detail hereinbelow.

The first border pattern 193a and the second border pattern 193b may have thicknesses in a range of about 2.5 μm to about 3.5 μm, and the first border pattern 193a has a thickness greater than a thickness of the second border pattern 193b. An amount of exposure to the first border pattern 193a may differ from an amount of exposure to the second border pattern 193b to impart a difference in the thicknesses.

For example, in a case where the shielding member 190 includes a negative photoresist, the first border pattern 193a and the column spacer 195 may be formed using the transmissive portion, and the black matrix pattern 191 and the second border pattern 193b may be formed using the semi-transmissive portion.

The first border pattern 193a and the second border pattern 193b may be alternately disposed in a plan view. As the first border pattern 193a and the second border pattern 193b are alternately disposed, over-etching of a portion of the black matrix pattern 191 adjacent to the first border pattern 193a that may occur due to loading effects may be efficiently reduced or prevented.

In such an embodiment, light leakage may occur because the second border pattern 193b has a thickness less than a thickness of the first border pattern 193a, and such light leakage may further be prevented by the gate metal pattern 125 disposed below the second border pattern 193b.

According to an exemplary embodiment, although the first border pattern 193a has a thickness greater than a thickness of the second border pattern 193b, as the gate metal pattern 125 having a thickness in a range of about 0.1 μm to about 1.0 μm is further disposed below the second border pattern 193b, the first border pattern 193a and the second border pattern 193b may have a step difference din a range of about 0.3 μm to about 0.7 μm.

The black matrix pattern 191 may have a height substantially the same as that of the black border pattern 193 at a portion thereof contacting the black border pattern 193 (near the boundary of NDA and DA). In addition, a dummy color filter that may be provided below a black border pattern in a conventional LCD device is absent in an exemplary embodiment such that an overall height of the black border pattern 193 may be reduced, thereby improving flowability of liquid crystal molecules.

A first alignment layer AL1 is disposed over the shielding member 190. The first alignment layer AL1 may be a homeotropic alignment layer or a photo-alignment layer including a photo-polymerization material.

The opposing substrate 200 may include an opposing base substrate 210, a common electrode 220, and a second alignment layer AL2.

The opposing base substrate 210 may be an insulating substrate, for example, a plastic substrate that has light transmission and flexible characteristics. However, exemplary embodiments are not limited thereto, and the opposing base substrate 210 may include a hard substrate such as a glass substrate.

The common electrode 220 may be a whole-plate electrode including or formed of a transparent conductor, for example, indium tin oxide ("ITO") or indium zinc oxide ("IZO"). In an alternative exemplary embodiment, the common electrode 220 may have an uneven portion or at least one slit to define a plurality of domains.

The second alignment layer AL2 may be a homeotropic alignment layer or a photo-alignment layer including a photo-polymerization material.

A sealant SA is disposed along the non-display area NDA, and seals the display substrate 100 and the opposing substrate 200.

FIGS. 6A to 6E are cross-sectional views illustrating a method of manufacturing an LCD device, according to an exemplary embodiment.

In reference to FIG. 6A, gate wirings including a gate line (not illustrated), a gate electrode 122, and a gate metal pattern 125 are disposed on a base substrate 110. The gate line and the gate electrode 122 may be formed in a display area DA and a non-display area NDA, and the gate metal pattern 125 may be formed in the non-display area NDA. The gate wirings may be formed in the same layer in the same process.

A first insulating layer 130 is disposed on the base substrate 110 on which the gate wirings are formed. The first insulating layer 130 may be formed through a chemical vapor deposition (CVD) process, a spin coating process, a sputtering process, a vacuum deposition process, and/or a printing process.

In reference to FIG. 6B, a semiconductor layer 140 is disposed on the base substrate 110 on which the first insulating layer 130 is formed to correspond to the gate electrode 122. In an exemplary embodiment, the semiconductor layer 140 may be formed to overlap the gate electrode 122. However, exemplary embodiments are not limited thereto, and the semiconductor layer 140 may be formed to overlap data wirings to be described below.

The data wirings including a data line (not illustrated), a source electrode 153, and a drain electrode 155 are disposed on the base substrate 110 on which the semiconductor layer 140 is formed. The source electrode 153 may be formed to overlap an end portion of the semiconductor layer 140, and the drain electrode 155 may be spaced apart from the source electrode 153 to overlap another end portion of the semiconductor layer 140.

Ohmic contact layers 153a and 155a may be formed between the source electrode 153 and the semiconductor layer 140 and between the drain electrode 155 and the semiconductor layer 140, respectively, to improve electric properties.

A second insulating layer 160 is disposed on the base substrate 110 on which the data wirings are formed. The second insulating layer 160 may be formed through a chemical vapor deposition (CVD) process, a spin coating process, a sputtering process, a vacuum deposition process, and/or a printing process.

In reference to FIG. 6C, a color filter 170 is disposed on the base substrate 110, on which the second insulating layer 160 is disposed, in the display area DA. Subsequently, a contact hole 175 is formed through the color filter 170 to expose a portion of the drain electrode 155.

In reference to FIG. 6D, a pixel electrode 180 is disposed over the color filter 170. The pixel electrode 180 is connected to the drain electrode 155 through the contact hole 175.

Figure 6E:
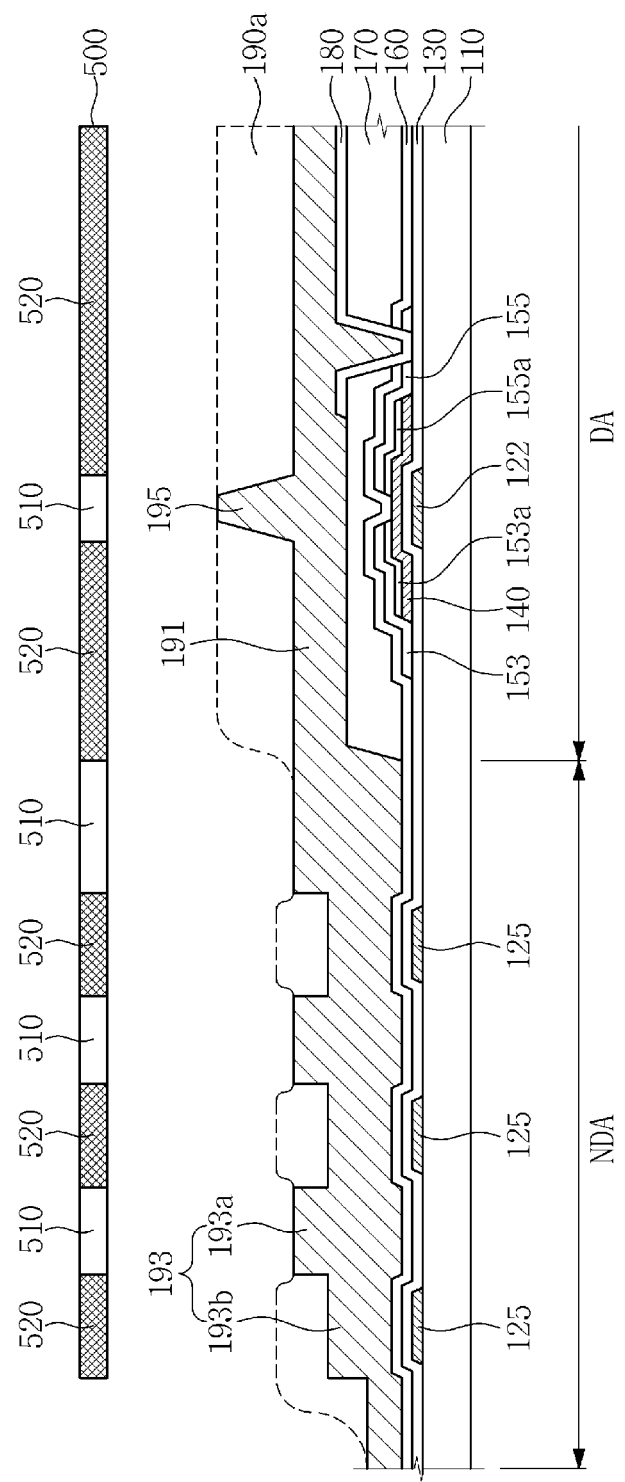

In reference to FIG. 6E, a shielding-member forming material 190a is disposed on the base substrate 110 on which the pixel electrode 180 is formed. In an exemplary embodiment, the shielding-member forming material 190a has a portion that is hardened under an exposure to light, and another portion that is unexposed to light is removed. However, exemplary embodiments are not limited thereto.

Subsequently to the shielding-member forming material 190a disposed on the base substrate 110, a mask 500 is disposed over the base substrate 110. The mask 500 may have a transmissive portion 510, a semi-transmissive portion 520, and a shielding portion (not illustrated). In an alternative exemplary embodiment, the mask 500 may include a slit portion in lieu of the semi-transmissive portion 520. When an amount of light transmitted through the transmissive portion 510 is 100%, an amount of light transmitted through the semi-transmissive portion 520 may be in a range of about 15% to about 20%.

The transmissive portion 510 overlaps a portion of the non-display area NDA to be formed with a first border pattern 193a, and overlaps a portion of the display area DA to be formed with a column spacer 195.

The semi-transmissive portion 520 overlaps a portion of the non-display area NDA to be formed with a second border pattern 193b, and overlaps a portion of the display area DA to be formed with a black matrix pattern 191.

The shielding portion (not illustrated) may overlap, in the display area DA, a pixel area in which the pixel electrode 180 is disposed.

The first border pattern 193a and the second border pattern 193b are alternately disposed in a plan view, and thus the transmissive portion 510 of the mask 500 and the semi-transmissive portion 520 of the mask 500 are alternately disposed.

As the second border pattern 193b is formed adjacent to the first border pattern 139a, a developing solution is prevented from flowing to the black matrix pattern 191 in the display area DA in a developing process subsequent to exposure. Consequently, over-etching of a portion of the black matrix pattern 191 adjacent to the first border pattern 193a can be efficiently reduced or prevented.

Further, light leakage that may occur due to the second border pattern 193b having a thickness less than a thickness of the first border pattern 193a may further be prevented by the gate metal pattern 125 that is disposed below the second border pattern 193b.

In addition, a dummy color filter that is provided below a black border pattern in a conventional LCD device is absent in an exemplary embodiment such that an overall height of the black border pattern 193 may be reduced, thereby improving flowability of liquid crystal molecules.

As set forth hereinabove, the LCD device according to one or more exemplary embodiments may efficiently reduce or prevent defects of low flowability of liquid crystal molecules by reducing a step difference of the shielding member in the non-display area.

The LCD device according to one or more exemplary embodiments may efficiently reduce or prevent defects caused due to loading effects by imparting a difference between thicknesses of the shielding members disposed in the non-display area.

The LCD device according to one or more exemplary embodiments may efficiently reduce or prevent light leakage by further disposing the metal pattern below the shielding member in the non-display area.

From the foregoing, it will be appreciated that various embodiments in accordance with the present disclosure have been described herein for purposes of illustration, and that various modifications may be made without departing from the scope and spirit of the present disclosure. Accordingly, the various embodiments disclosed herein are not intended to be limiting of the true scope and spirit of the present disclosure.

What is claimed is:

1. A display substrate comprising:
   a base substrate having a display area and a non-display area surrounding the display area;
   a gate line disposed on the base substrate and extending in a first direction;
   a data line disposed on the base substrate and extending in a second direction;

a thin film transistor connected to the gate line and the data line;

a color filter disposed on the thin film transistor in the display area;

a pixel electrode disposed on the color filter and connected to the thin film transistor;

a black matrix pattern disposed to correspond to the gate line and the data line;

a black border pattern disposed in the non-display area, the black border pattern comprising a first border pattern having a first thickness and a second border pattern having a second thickness that is less than the first thickness of the first border pattern; and a gate metal pattern disposed below the second border pattern.

2. The display substrate of claim 1, wherein the gate metal pattern has a thickness in a range of about 0.1 µm to about 1.0 µm.

3. The display substrate of claim 1, wherein each of the first border pattern and the second border pattern has a thickness in a range of about 2.5 µm to about 3.5 µm.

4. The display substrate of claim 1, wherein each of the first border pattern and the second border pattern has a step difference in a range of about 0.3 µm to about 0.7 µm.

5. The display substrate of claim 1, wherein the gate metal pattern and the gate line are disposed on the same layer.

6. The display substrate of claim 1, wherein the first border pattern and the second border pattern are alternately disposed in a plan view.

7. The display substrate of claim 1, wherein the black matrix pattern and the black border pattern have a substantially same height at a portion of the black matrix pattern contacting the black border pattern.

8. The display substrate of claim 7, wherein the color filter is absent below the black border pattern at a portion where the black border pattern and the black matrix pattern contact each other.

9. The display substrate of claim 1, wherein the black matrix pattern is dipsosed on the color filter and further comprises a column spacer disposed on the black matrix pattern.

10. A liquid crystal display (LCD) device comprising:
a display substrate;
an opposing substrate facing the display substrate; and
a liquid crystal layer disposed between the display substrate and the opposing substrate,
wherein the display substrate comprises:
a base substrate having a display area and a non-display area surrounding the display area;
a gate line disposed on the base substrate and extending in a first direction;
a data line disposed on the base substrate and extending in a second direction;
a thin film transistor connected to the gate line and the data line;
a color filter disposed on the thin film transistor in the display area;
a pixel electrode disposed on the color filter and connected to the thin film transistor;
a black matrix pattern disposed to correspond to the gate line and the data line;
a black border pattern disposed in the non-display area, the black border pattern including a first border pattern having a first thickness and a second border pattern having a second thickness that is less than the first thickness of the first border pattern; and
a gate metal pattern disposed below the second border pattern.

11. The LCD device of claim 10, wherein the gate metal pattern has a thickness in a range of about 0.1 µm to about 1.0 µm.

12. The LCD device of claim 10, wherein each of the first border pattern and the second border pattern has a thickness in a range of about 2.5 µm to about 3.5 µm.

13. The LCD device of claim 10, wherein each of the first border pattern and the second border pattern has a step difference in a range of about 0.3 µm to about 0.7 µm.

14. The LCD device of claim 10, wherein the gate metal pattern and the gate line are disposed on the same layer.

15. The LCD device of claim 10, wherein the first border pattern and the second border pattern are alternately disposed in a plan view.

16. The LCD device of claim 10, wherein the black matrix pattern and the black border pattern have a substantially same height at a portion of the black matrix pattern contacting the black border pattern.

17. A method of manufacturing an LCD device, the method comprising:
preparing a base substrate having a display area and a non-display area surrounding the display area;
forming a gate line on the base substrate, the gate line extending in a first direction;
forming a data line on the base substrate, the data line extending in a second direction;
forming a thin film transistor connected to the gate line and the data line and a pixel electrode being connected to the thin film transistor; and
forming a black matrix pattern on the gate line and the data line and a black border pattern in the non-display area,
wherein the forming of the black border pattern comprises simultaneously forming, using a mask having a semi-transmissive portion, a first border pattern having a first thickness and a second border pattern having a second thickness that is less than the first thickness of the first border pattern.

18. The method of claim 17, further comprising forming a gate metal pattern below the second border pattern.

19. The method of claim 18, wherein the gate metal pattern and the gate line are formed simultaneously.

20. The method of claim 17, wherein the first border pattern and the second border pattern are alternately formed in a plan view.

* * * * *